United States Patent
Hurd et al.

(10) Patent No.: US 9,969,244 B2
(45) Date of Patent: May 15, 2018

(54) VEHICLE INSTRUMENT PANEL WITH DEPLOYABLE AIR REGISTER

(71) Applicant: Ford Global Technologies, LLC, Dearborn, MI (US)

(72) Inventors: James R. Hurd, Canton, MI (US); Paul Bryan Hoke, Plymouth, MI (US); Fred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1281 days.

(21) Appl. No.: 13/676,156

(22) Filed: Nov. 14, 2012

(65) Prior Publication Data

US 2014/0131026 A1    May 15, 2014

(51) Int. Cl.
*B60H 1/00* (2006.01)
*B60H 1/34* (2006.01)

(52) U.S. Cl.
CPC ..... *B60H 1/00842* (2013.01); *B60H 1/00821* (2013.01); *B60H 1/3414* (2013.01)

(58) Field of Classification Search
CPC ............ B60H 1/00821; B60H 1/00842; B60H 1/3414; B60H 1/00664; B60H 1/00671;
(Continued)

(56) References Cited

U.S. PATENT DOCUMENTS

| | | | | |
|---|---|---|---|---|
| 622,375 | A | * 4/1899 | Leather | F24F 13/075 454/316 |
| 1,751,441 | A | * 3/1930 | Campbell | B60H 1/3407 454/144 |

(Continued)

FOREIGN PATENT DOCUMENTS

| | | |
|---|---|---|
| DE | 10046628 A1 | 3/2002 |
| JP | 2007238046 A | 9/2007 |
| WO | 9501592 A1 | 1/1995 |

OTHER PUBLICATIONS

Nissan Motor Co., Ltd., Mitsuaki Hagino, Junichiro Hara, Koetsu Takehana, Kazumasa Tanaka, Masahiko Iwasaki, "The Development of a Variable Airflow Control System Using New Ventilators", JSAE Technical Paper No. 921108, Publisher—Society of Automotive Engineers of Japan, Inc., Tokyo, Japan; Published Jan. 1, 1992.

*Primary Examiner* — Travis Ruby
(74) *Attorney, Agent, or Firm* — LeClairRyan

(57) ABSTRACT

A vehicle air circulating system comprises a controller, an interior condition sensor attached to the controller, an instrument panel, and a deployable register assembly attached to the controller and pivotably attached to the instrument panel. The register assembly includes a first register and a second register and is movable between a closed position in which the first register is recessed within the instrument panel and is thus obstructed and an open position in which the first register is deployed. The second register remains unobstructed whether the register assembly is in its closed or open position. The deployable registers provide directional control for pull down conditions. Once the desired conditions are achieved, the deployable registers lower into the instrument panel and the other registers provide a larger opening to direct the air overhead at lower velocities keeping the vehicle cabin cool while not blowing in the direction of the occupants.

13 Claims, 11 Drawing Sheets

(58) Field of Classification Search
CPC ............ B60H 1/00692; B60H 1/00835; B60H 2001/00185; B60H 2001/00721
USPC ........................................................ 165/204
See application file for complete search history.

(56) References Cited

U.S. PATENT DOCUMENTS

| | | | | |
|---|---|---|---|---|
| 3,264,971 A * | 8/1966 | Dangauthier | ........ | B60H 1/3435 |
| | | | | 454/127 |
| 3,572,233 A * | 3/1971 | Bar | ........... | B60S 1/54 |
| | | | | 454/154 |
| 4,559,868 A * | 12/1985 | Nonaka | ................ | B60H 1/3407 |
| | | | | 180/90 |
| 5,674,124 A * | 10/1997 | Davis | ..................... | F24F 13/08 |
| | | | | 454/289 |
| 5,752,877 A * | 5/1998 | Sun | ........... | B60H 1/34 |
| | | | | 454/155 |
| 5,860,593 A * | 1/1999 | Heinle | ................ | B60H 1/0075 |
| | | | | 165/204 |
| 5,878,809 A * | 3/1999 | Heinle | .............. | B60H 1/00742 |
| | | | | 165/203 |
| 6,554,696 B2 * | 4/2003 | Kowalski | ........... | B60H 1/00742 |
| | | | | 454/155 |
| 6,918,262 B2 | 7/2005 | Kamiya et al. | | |
| 7,191,611 B2 | 5/2007 | Hatakeyama et al. | | |
| 9,315,090 B2 * | 4/2016 | Wittorf | ................ | B60H 1/3421 |
| 2005/0176364 A1 * | 8/2005 | Gehring | .............. | B60H 1/3414 |
| | | | | 454/155 |

\* cited by examiner

VEHICLE INSTRUMENT PANEL WITH DEPLOYABLE AIR REGISTER

TECHNICAL FIELD

The disclosed invention relates generally to HVAC systems for vehicles. More particularly, the disclosed invention relates to an HVAC system having selectively deployable registers having directional control for pull down conditions which then lower into the instrument panel and allow for a remaining opening to direct the air overhead at lower velocities keeping the vehicle cabin cool while not blowing direction on the occupants.

BACKGROUND OF THE INVENTION

Cabin comfort is maintained by both vehicle heating and cooling systems typically through a series of registers and vents selectively controlled. Modern automotive heating, ventilation and air conditioning (HVAC) systems generally provide a proper and comfortable vehicle interior environment.

Vehicle registers play a pivotal role in establishing and maintaining the cabin temperature. Most vehicle HVAC systems include at least one register fitted to the front or occupant-facing side of the instrument panel. Such registers ordinarily include a plurality of pivotable vanes.

After a vehicle cabin reaches the desired temperature, occupants often would like to maintain a comfortable temperature without feeling the air draft on their body typically associated with traditional air registers, particularly those fitted to the front side of the instrument panel. The ability to continually turn over the cabin air with conditioned air while not feeling higher velocity drafts is desired. However, a directional higher velocity outlet is still needed to pull the cabin down in hot ambient.

As in so many areas of vehicle technology, particularly with respect to vehicle HVAC systems, there is always room for improvement.

SUMMARY OF THE INVENTION

The disclosed invention overcomes several of the problems of the prior art by providing a vehicle air circulating system that comprises a controller, an interior condition sensor attached to the controller, an instrument panel, and a selectively deployable register assembly attached to the controller and movably attached to the instrument panel.

The register assembly includes a first register and a second register and is movable between a closed position in which the first register is substantially recessed within the instrument panel and is thus obstructed and an open position in which the first register is substantially extended from the instrument panel. The second register remains unobstructed whether the register assembly is in its closed or open position.

The outlet dimension of the second register may be larger or smaller than the outlet dimension of the first register. It may be larger if increased air flow or reduced NVH are desired. It may be smaller if an improved appearance is desired. Preferably, but not absolutely, the first register is a pair of registers and the second register is a pair of registers.

The register assembly is pivotably attached to the instrument panel and is pivotally movable between the closed position and the open position. The registers may be fitted with a movable gate or a movable curtain to control air flow.

According to the arrangement of the disclosed invention, the selectively deployable registers provide directional control for pull down conditions. Once the desired conditions are achieved, the deployable registers lower into the instrument panel and the other registers provide an opening to direct the air, for example, overhead at lower velocities keeping the vehicle cabin cool while not blowing in the direction of the occupants. While an overhead air flow is indicated as a desirable example, it is to be understood that the direction of air flow could be elsewhere in the vehicle other than overhead.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
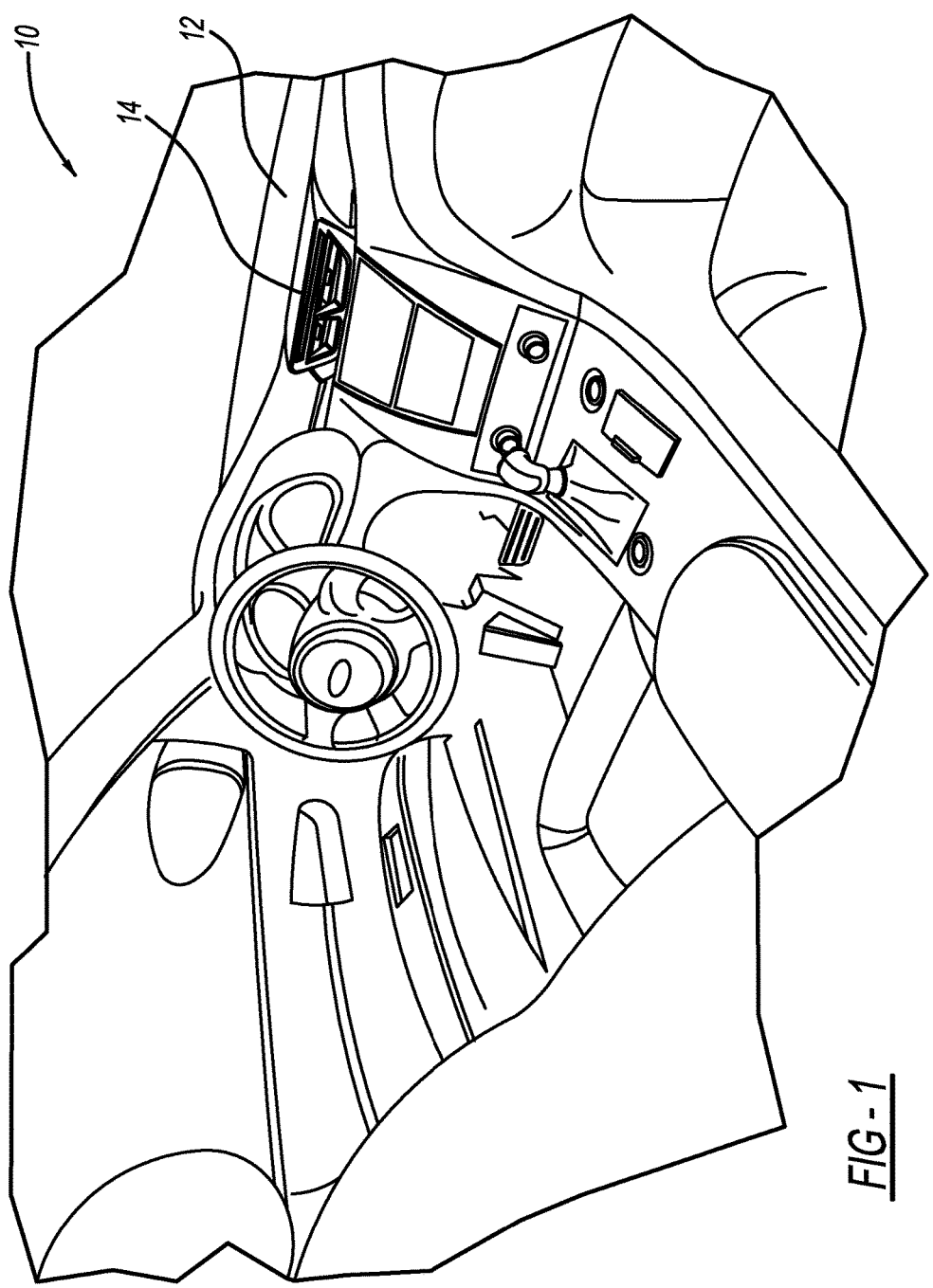
FIG. 1 illustrates a partial view of a vehicle interior having an embodiment of the deployable register arrangement of the disclosed invention.

In the following figures, the same reference numerals will be used to refer to the same components. In the following description, various operating parameters and components are described for different constructed embodiments. These specific parameters and components are included as examples and are not meant to be limiting.

The disclosed invention may be suitable for use in a great variety of vehicles. FIG. 1 illustrates one such embodiment of a vehicle interior, generally illustrated as 10. The illustrated interior 10 is not intended as being limiting but is intended as providing a general configuration in which the disclosed invention may be employed as the deployable register arrangement of the disclosed invention may have utility in virtually any vehicle.

The vehicle 10 includes an instrument panel 12 of a conventional shape. Instrument panels of a variety of alternative shapes may be suitable for this same purpose. Fitted into the instrument panel 12 is one embodiment of a selectively deployable register arrangement 14 according to the disclosed invention. The deployable register arrangement 14 is pivotably attached to the top of the instrument panel 12.

Figure 2:
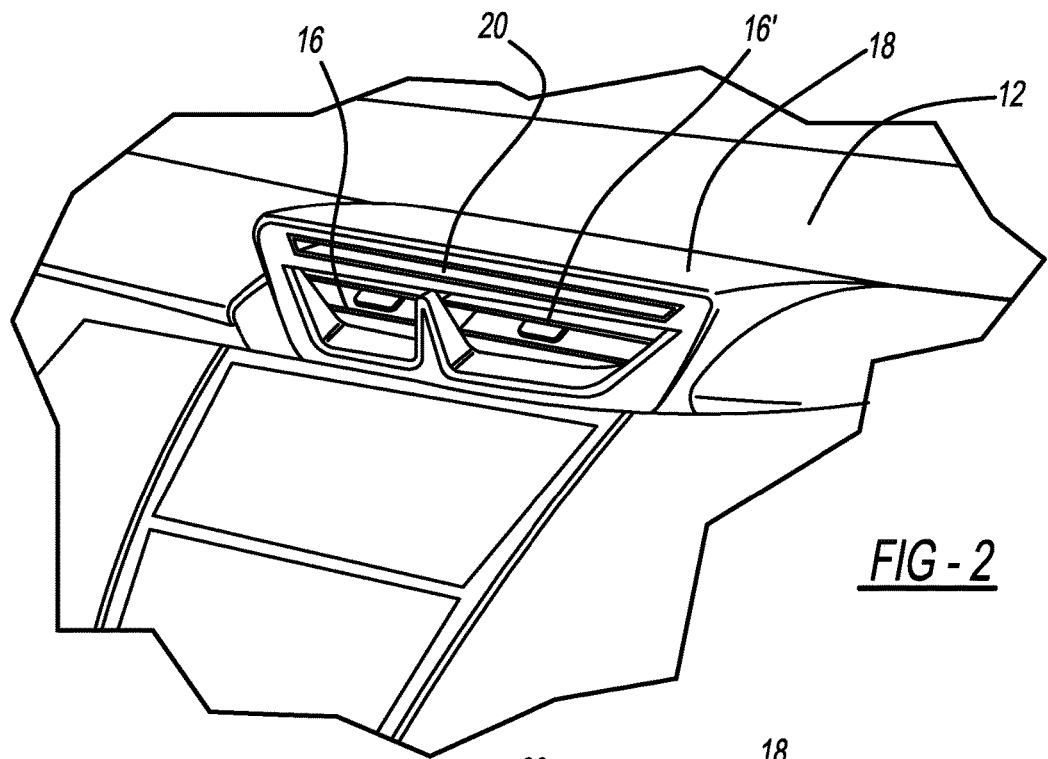
FIG. 2 illustrates a close-up view of a first embodiment of the selectively deployable register arrangement of the disclosed invention in its deployed or open position.
Figure 3:
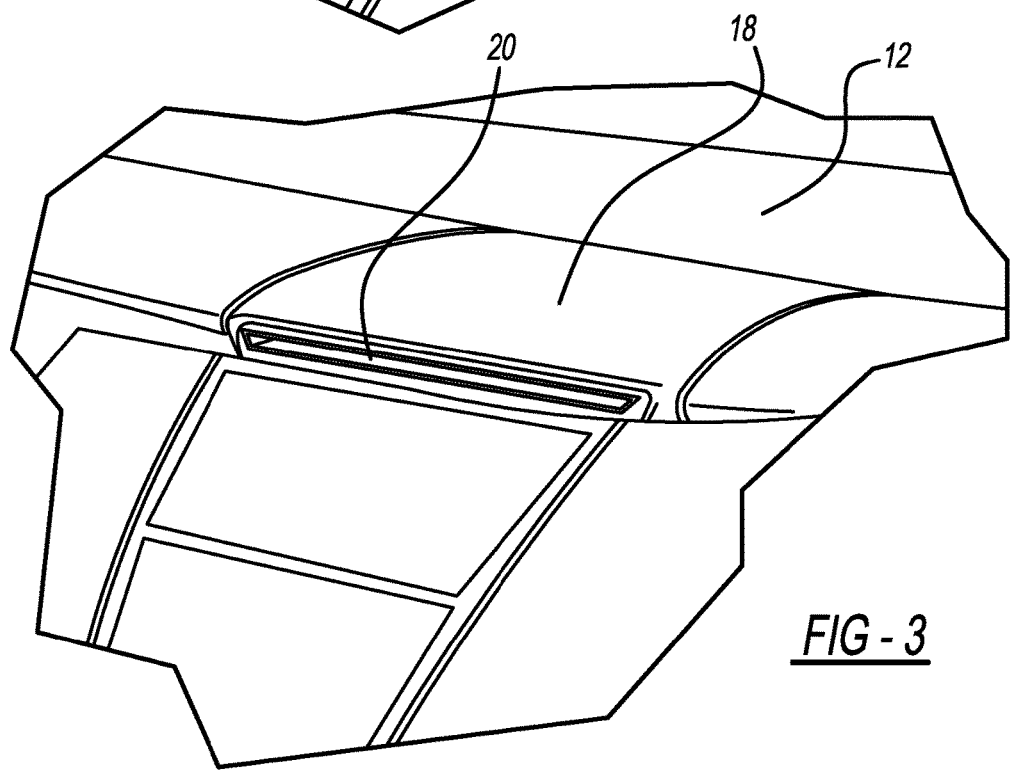
FIG. 3 illustrates the same view as that of FIG. 2 but shows the embodiment of the deployable arrangement of the disclosed invention of that figure in its recessed or closed position.

FIGS. 2 and 3 illustrate the deployable register arrangement 14 in greater detail. In FIG. 2 the deployable register arrangement 14 is illustrated in its deployed or open position. In this position directional control is made available for pull down conditions. Once the optimum interior conditions are achieved the deployable register arrangement 14 is lowered into the instrument panel 12. In FIG. 3 the deployable register arrangement 14 is illustrated in its recessed or closed position after the desired interior conditions have been achieved.

The register arrangement 14 includes a first deployable register 16 and a second deployable register 16'. While two deployable registers are illustrated, it is to be understood that a greater or lesser number of deployable registers as well as deployable registers having a different shapes and sizes may be employed in the disclosed invention without deviating from either its spirit or its scope.

In addition to the first deployable register 16 and the second deployable register 16', the arrangement 14 of the disclosed invention includes a top 18. When the deployable register arrangement 14 of the disclosed invention is in its closed or recessed position as illustrated in FIG. 3 the top 18 is generally flush with the adjacent top surface of the instrument panel 12.

A register 20 is also fitted to the deployable register arrangement 14. The register 20 does not recess with the registers 16 and 16' when the deployable register arrangement 14 is moved to its closed or recessed position as shown in FIG. 3. Instead the register 20 remains available to direct circulating air at a lower velocity overhead to thus constantly maintain cabin conditions at a comfortable level without blowing in the direction of the occupants.

Figure 4:
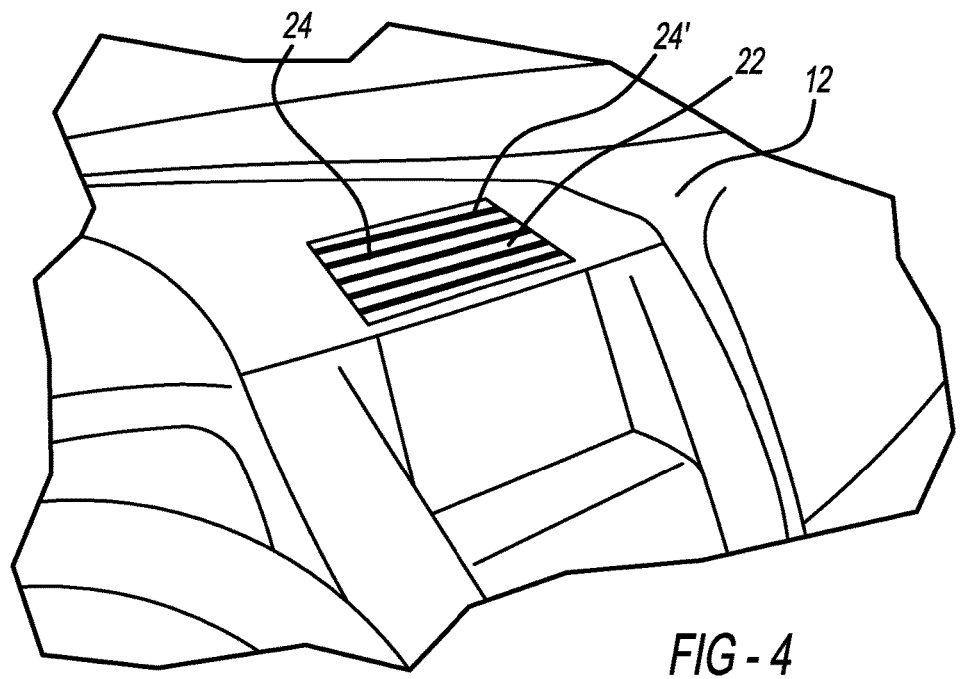
FIG. 4 illustrates a close-up view of a second embodiment of the deployable register arrangement of the disclosed invention in its recessed or closed position.

The embodiment of the deployable register arrangement shown in FIGS. 2 and 3 and discussed in conjunction therewith is one approach to achieving the goals of the disclosed invention. An alternative approach is set forth in FIGS. 4 and 5 in which a second embodiment of the deployable register arrangement, an arrangement 22, is shown. In FIG. 4 the deployable register arrangement 22 is illustrated in its lowered or recessed position whereas in FIG. 5 the deployable register arrangement 22 is shown in its deployed or open position.

Figure 5:
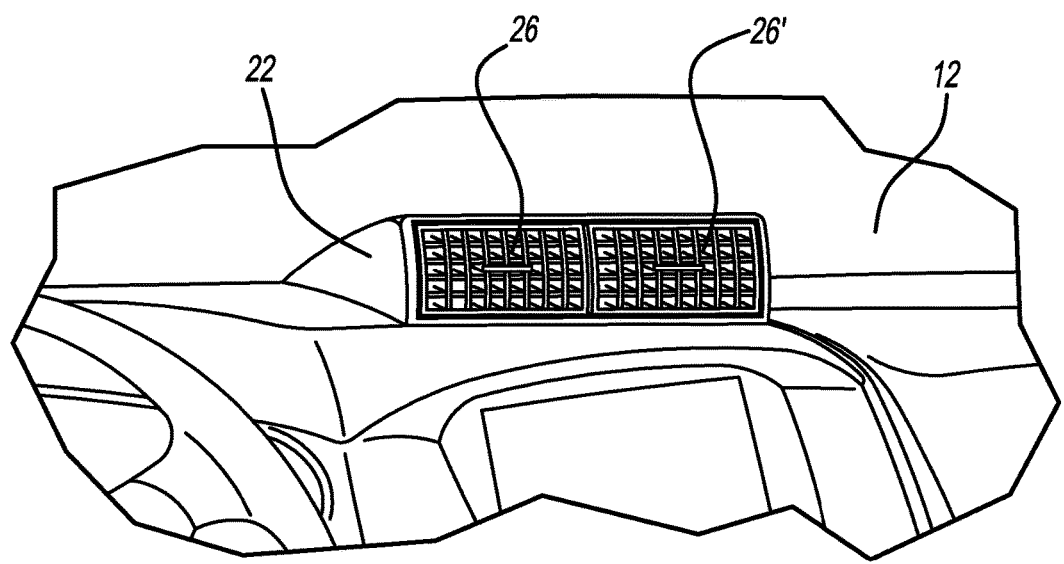
FIG. 5 illustrates the same view as that of FIG. 4 but shows the embodiment of the deployable arrangement of the disclosed invention of that figure in its deployed or open position.

With reference to FIGS. 4 and 5, the deployable register arrangement 22 includes a first upper register 24 and a second upper register 24'. The register arrangement 22 also includes a first deployable register 26 and a second deployable register 26'. The upper registers 24 and 24' function like the register 20 of the embodiment shown in FIGS. 2 and 3 and described in conjunction therewith, that is, they remain available even when the arrangement 22 is in its lowered position (as illustrated in FIG. 4) to direct circulating air at a lower velocity overhead thereby maintaining desirable cabin conditions without blowing in the direction of the occupants. The number, size, placement and shape of the registers 24, 24', 26 and 26' may be varied and are not to be limited by the illustrated configurations.

Regardless of the embodiment, when the deployable register arrangement of the disclosed invention is in its deployed or open position (as shown in FIGS. 2 and 5) air passes through the front registers 16 and 16' or 26 and 26' (as the case may be) while being blocked from passing through the register 20 or the registers 24 and 24' (again as the case may be). However, when the deployable register arrangement of the disclosed invention is moved to its recessed or lowered position (as shown in FIGS. 3 and 4) air is blocked from passing through either the front registers 16 and 16' or 26 and 26' and may only then be selectively passed through the registers 20 or 24 and 24'.

Accordingly, the disclosed invention is provided with one or more physical structures to regulate the passage of air through the registers 20 or 24 and 24' as will be set forth below in relation to FIGS. 6 through 9. These structures are shown in relation to the deployable register arrangement 22 of FIGS. 4 and 5 but may be equally suited for use with the deployable arrangement 18 of FIGS. 2 and 3. Thus the following discussion and the related figures are intended as being illustrative and not limiting.

Determination of whether or not the deployable register arrangement is to be in its deployed and open position or is to be put to its recessed or closed position is made by a sensor operatively associated with the HVAC system, such as a sensor 25. The sensor 25 is itself operatively associated with a controller 27 that controls deployable register arrangement operations, including for example movement between the open or closed positions and closure of one or more of the registers.

Figure 6:
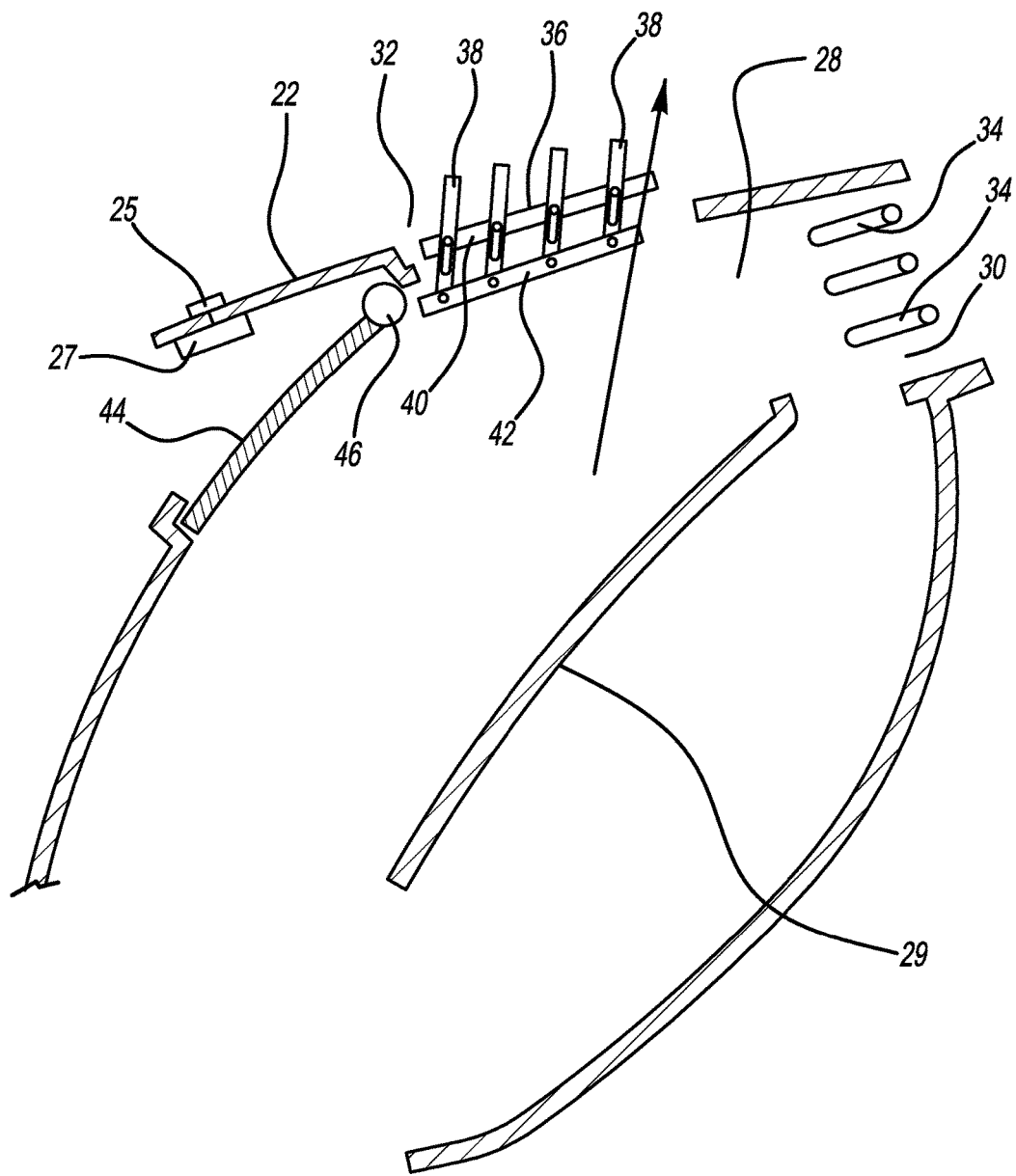
FIG. 6 illustrates a sectional view of a first embodiment of the deployable register arrangement of FIGS. 4 and 5 showing the upper register in its open position.
Figure 7:
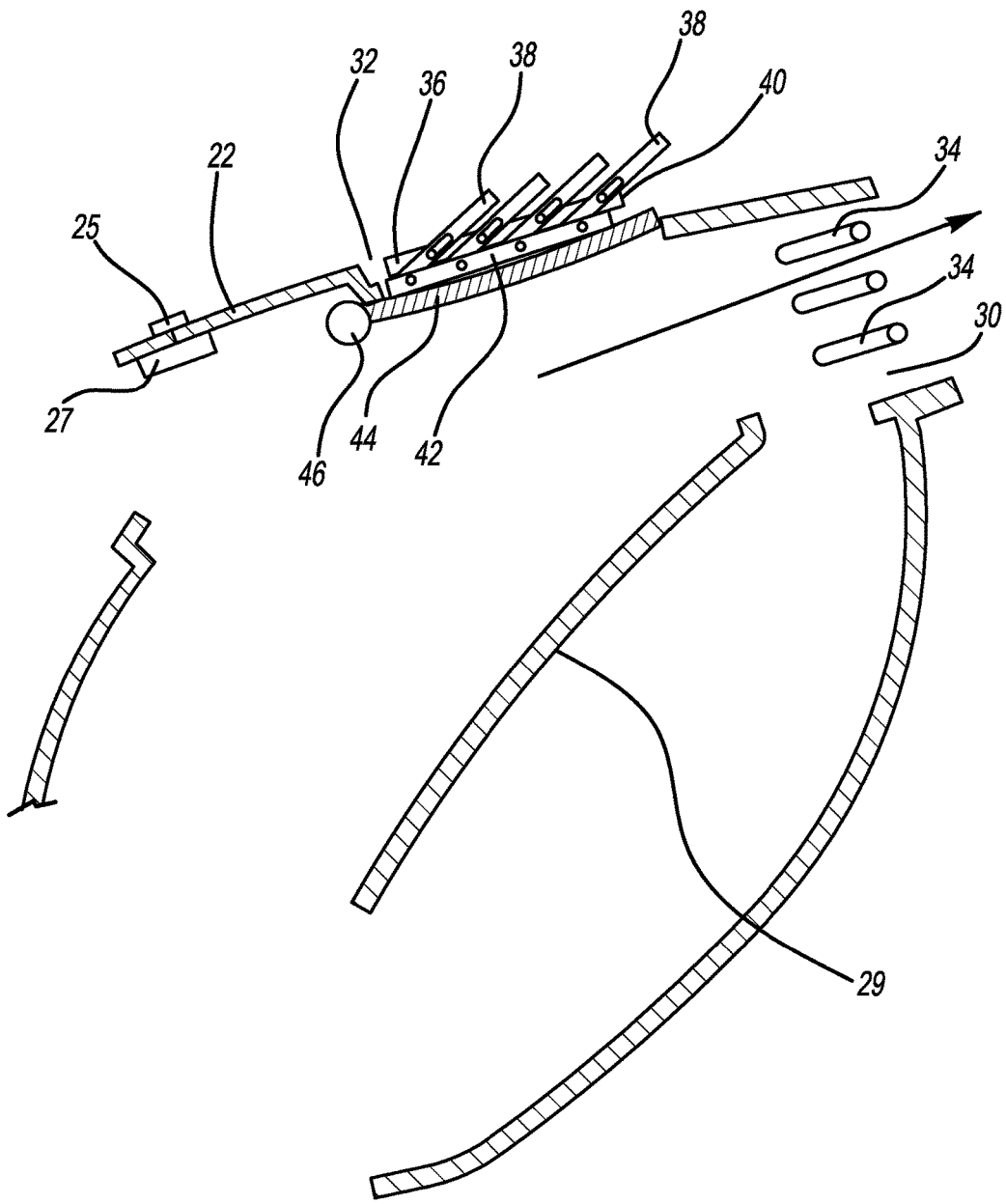
FIG. 7 is the same view as that of FIG. 6 but shows the upper register in its closed position.

Referring to FIGS. 6 and 7, the details of one embodiment of the deployable register arrangement 22 of the disclosed invention are illustrated as a register system 28. The register system 28 includes a movable septum 29 that is movable between a closed position which may selectively block the flow of air and an open position. The open position of the septum 29 is illustrated in FIGS. 6 and 7.

The register system 28 includes a front register 30 and an upper register 32. The front register 30 includes a plurality of vanes 34 that are movable between an open position (as illustrated) and a closed position. The upper register 32 also includes a vent assembly 36 that includes a plurality of vanes 38. The vanes 38 are movable between an open position (illustrated in FIG. 6) and a closed position (as illustrated in FIG. 7).

The vanes 38 are pivotably attached to a movable plate 40 and to a fixed plate 42. Movement of the movable plate 40 relative to the fixed plate 42 by such means as, for example, a gear or a lever arrangement, results in the vanes 38 being either open (as illustrated in FIG. 6) whereby air is allowed to pass or closed (as illustrated in FIG. 7) whereby air is blocked from passage.

In addition to the vent assembly 36 being movable between open and closed positions, another closure method additionally or alternatively provided. According to this arrangement, a gate 44 is provided and is pivotable on gate pivot point 46 between an open position (shown in FIG. 6) and a closed position (shown in FIG. 7). According to this arrangement, the flow of air through the vent assembly 36 is highly tunable and can be adapted for the shape and size of the vehicle interior as well as for the preferences of the vehicle occupants.

Figure 8:
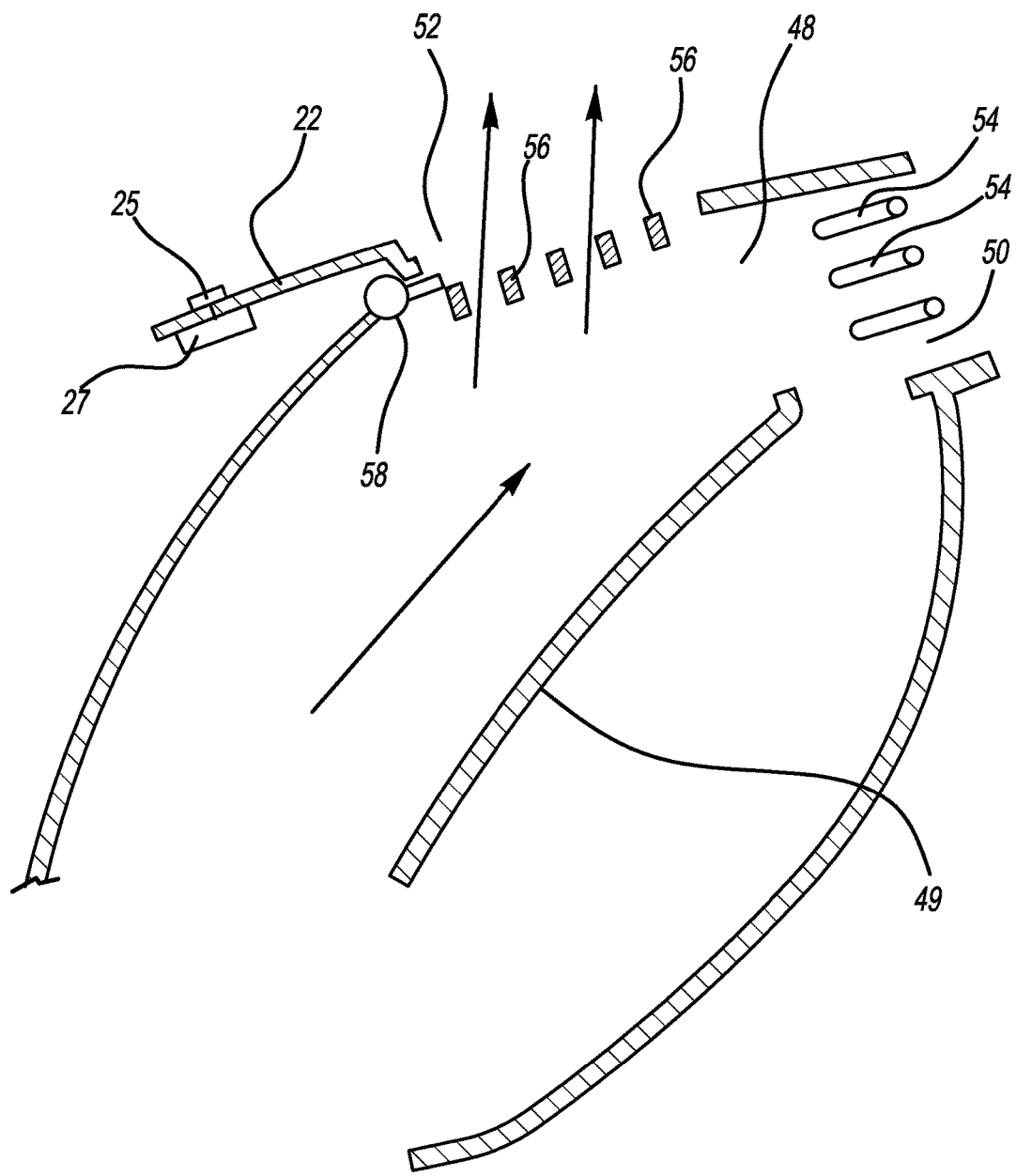
FIG. 8 illustrates a sectional view of a second embodiment of the deployable register arrangement of FIGS. 4 and 5 showing the upper register in its open position.
Figure 9:
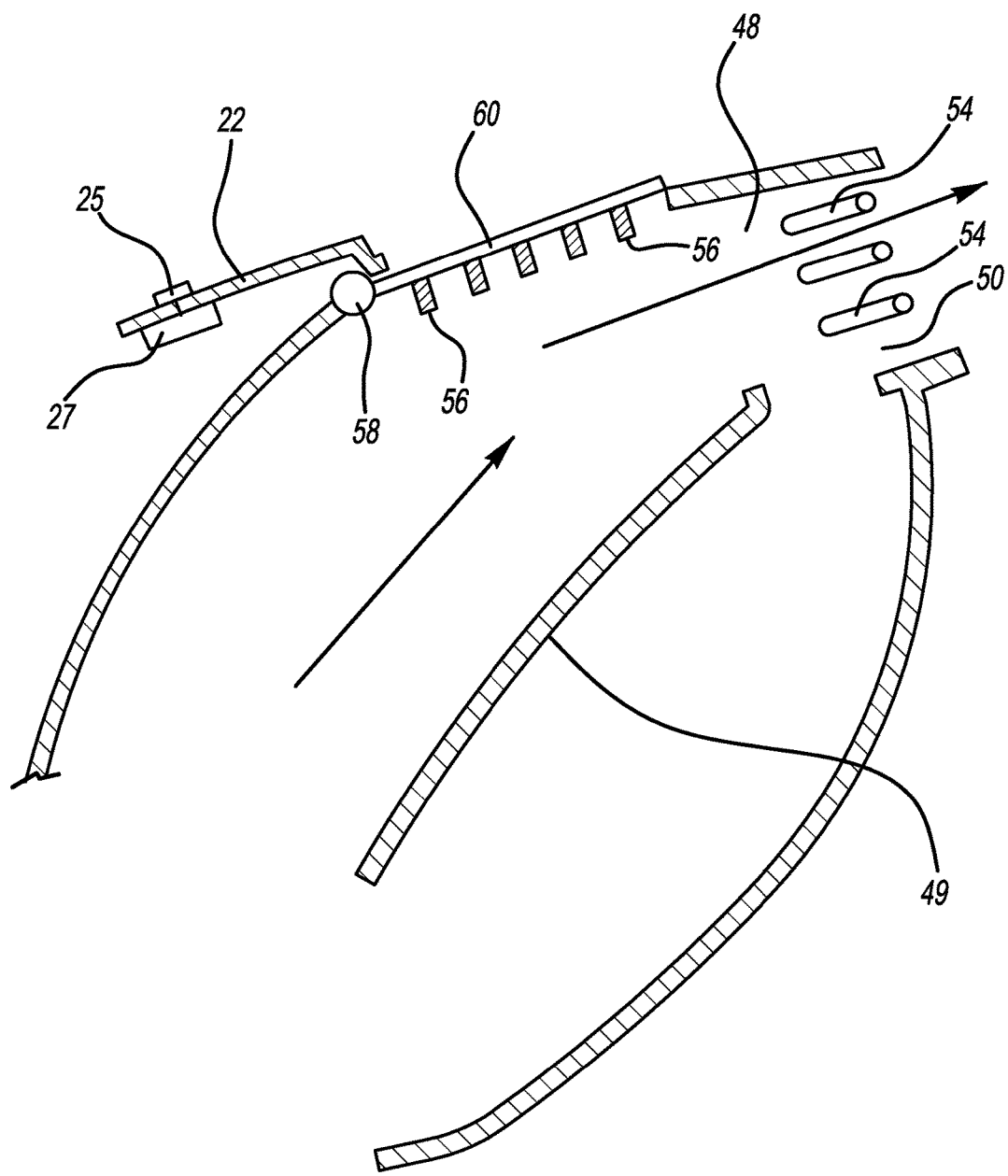
FIG. 9 is the same view as that of FIG. 8 but shows the upper register in its closed position.
Figure 10:
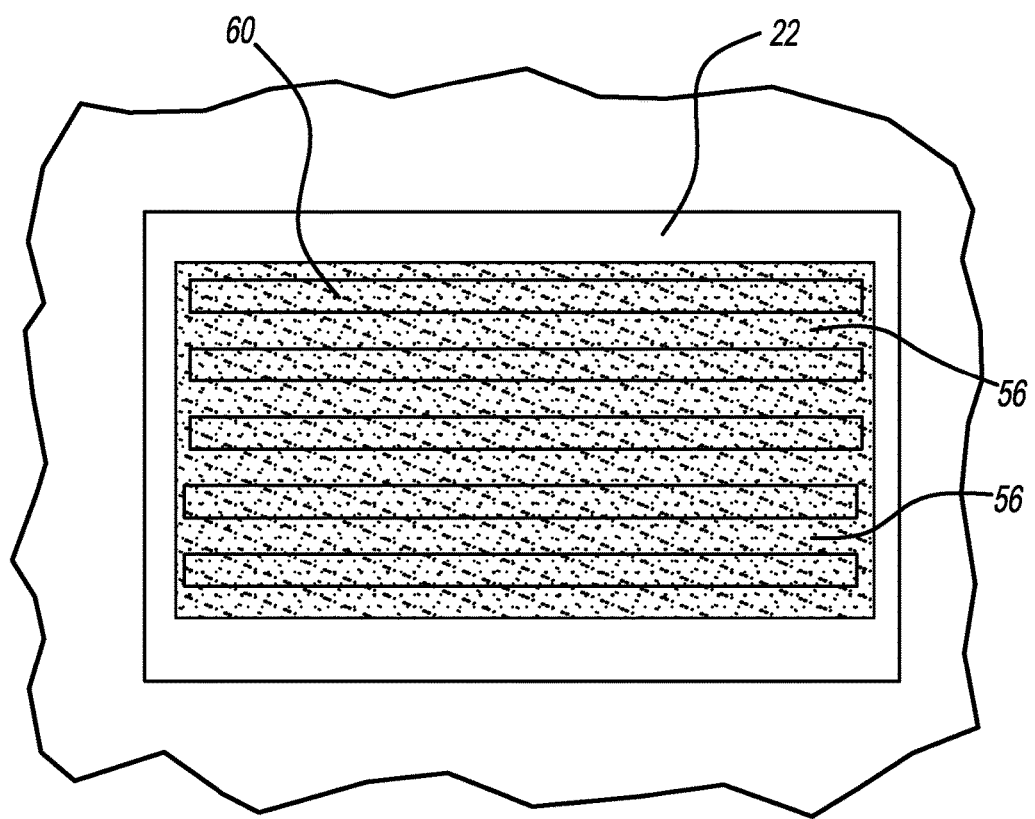
FIG. 10 illustrates a plan view of the upper register illustrating the membrane substantially covering the supporting ribs.

An alternative embodiment of the deployable register arrangement 22 of the disclosed invention is shown in FIGS. 8, 9 and 10. With reference thereto, a register system, generally shown as 48, is illustrated. The register system 48 also includes a movable septum 49. The movable septum 49 is movable between a closed position which may selectively block the flow of air and an open position. The open position of the septum 49 is illustrated in FIGS. 8 and 9.

The register system 48 includes a front register 50 and an upper register 52. The front register 50 includes a plurality of vanes 54 that are movable between an open position (as illustrated in the figures) and a closed position. The upper register 22 also includes a plurality of fixed vanes 56 that are part of a rib structure.

To halt the passage of air through the upper register 52 a movable membrane is provided. Particularly, a take-up roller 58 is provided to selectively retract or extend a flexible membrane 60. The membrane 60 is a permeable material or fabric that permits a controlled volume of air to pass thereby even when the membrane 60 is moved to its closed position. The material, thickness, mesh and denier of the membrane 60 may be tuned to control air flow. Accordingly, the overall degree of permeability of the membrane 60 may be based on the desired air flow. Like the arrangement of the upper register 32 shown in FIGS. 6 and 7, the arrangement of the upper register 52 may be adjusted or tuned to achieve optimum air flow to meet cabin requirements and occupant preferences.

The membrane 60 is movable between the open position shown in FIG. 8 and the closed position shown in FIGS. 9 and 10. Of course the membrane 60 may cover all or part of the opening of the upper register 52 so as to adjust air flow.

Figure 11:
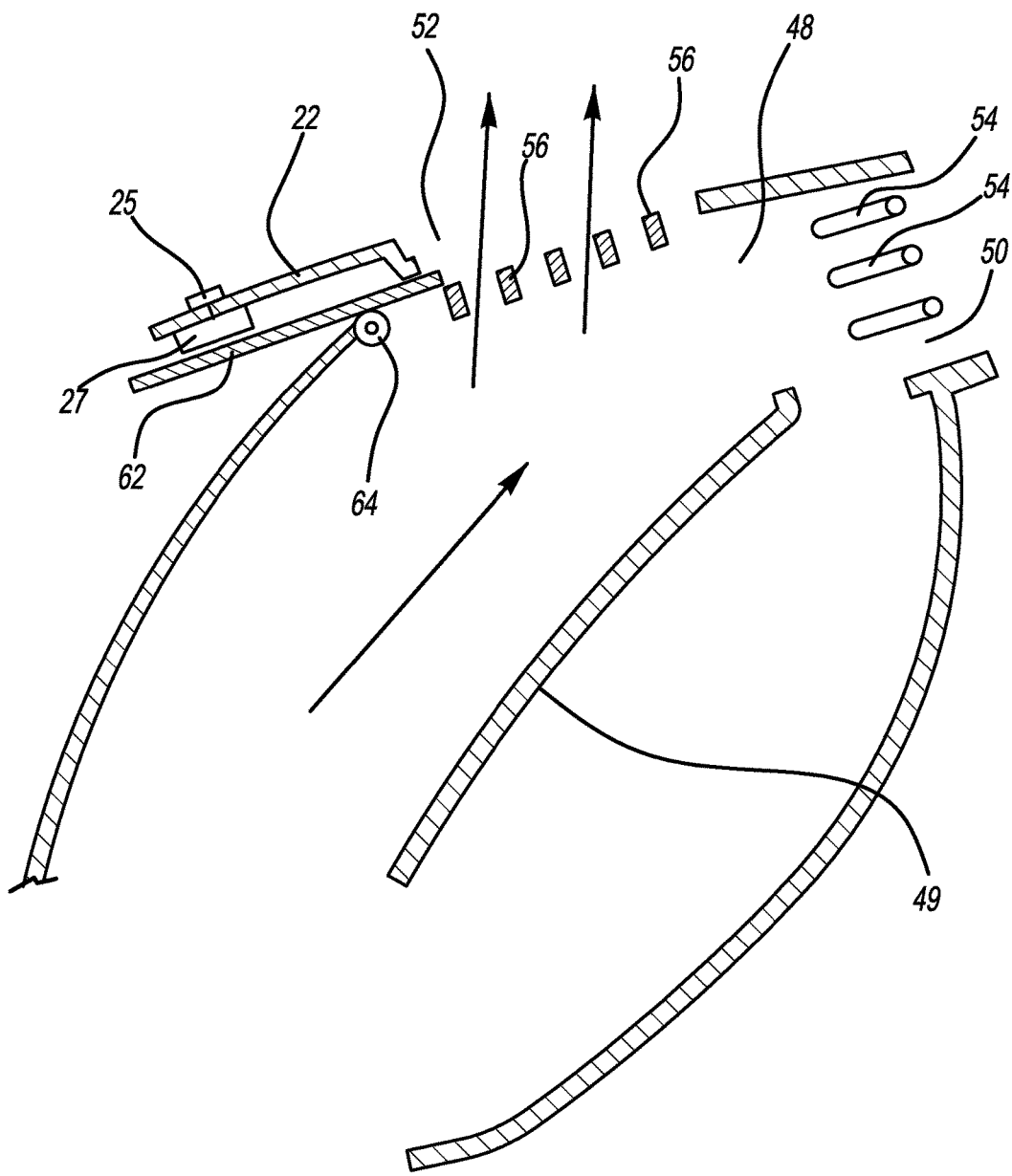
FIG. 11 illustrates a sectional view of a third embodiment of the deployable register arrangement of FIGS. 4 and 5 showing the upper register in its open position.
Figure 12:
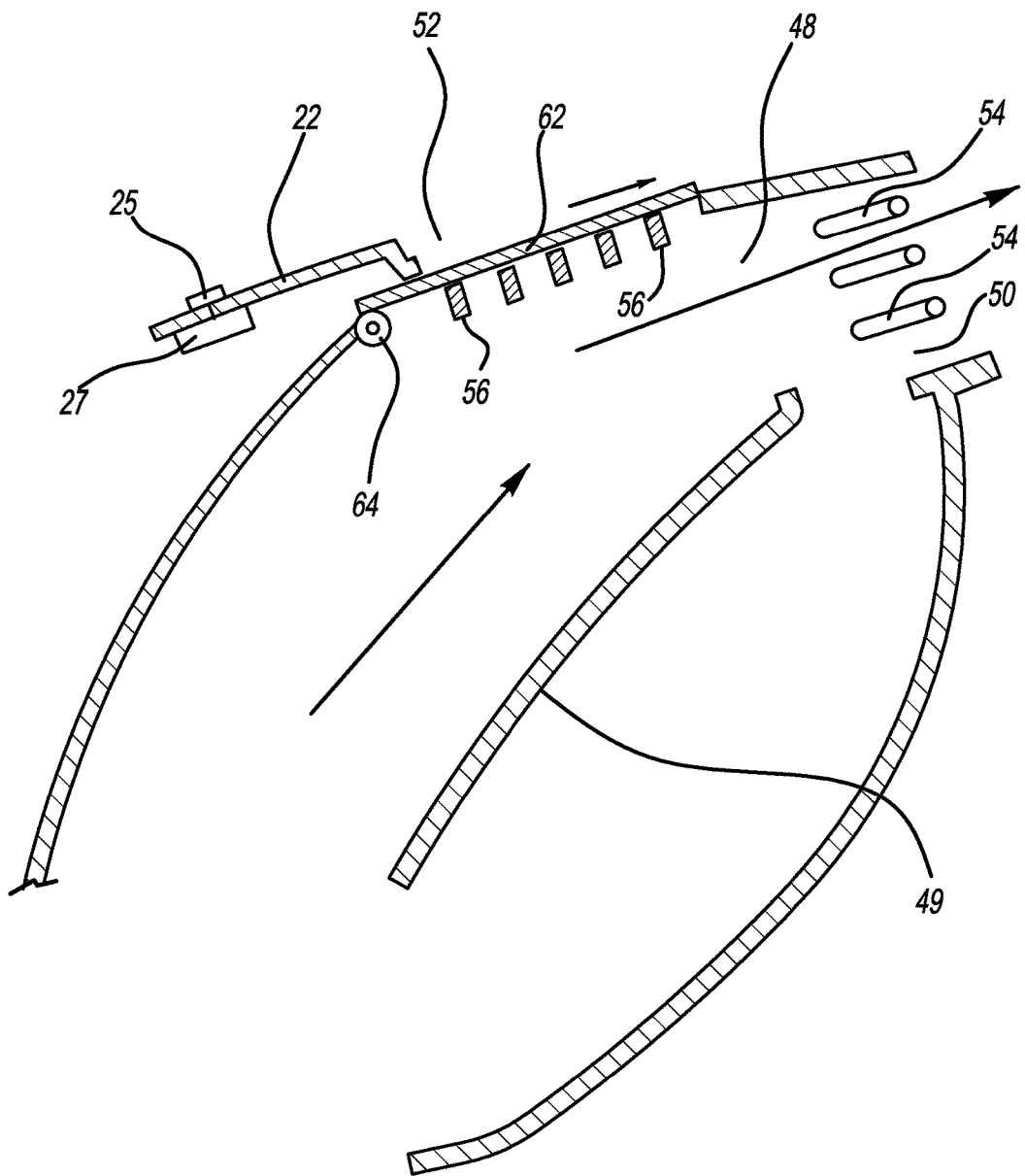
FIG. 12 is the same view as that of FIG. 11 but shows the upper register in its closed position.

As a variation to the arrangement shown in FIGS. 8, 9 and 10 and described in relation thereto, a solid door 62 may be substituted for the flexible membrane. This variation is illustrated in FIGS. 11 and 12 in which the door 62 is movably supported by a roller 64. When airflow is desired, the door 62 is moved to its open position as shown in FIG. 11. When no airflow is desired, the door 62 is moved to its closed position as illustrated in FIG. 12. Support for the closed door 62 is provided at least in part by the vanes 56 of the rib structure.

Instead of the door 62 being fully closed or open it may be partially closed as desired to control and thereby fine tune air flow. Infinite variations are thus possible depending on flow preferences and requirements.

Figure 13:
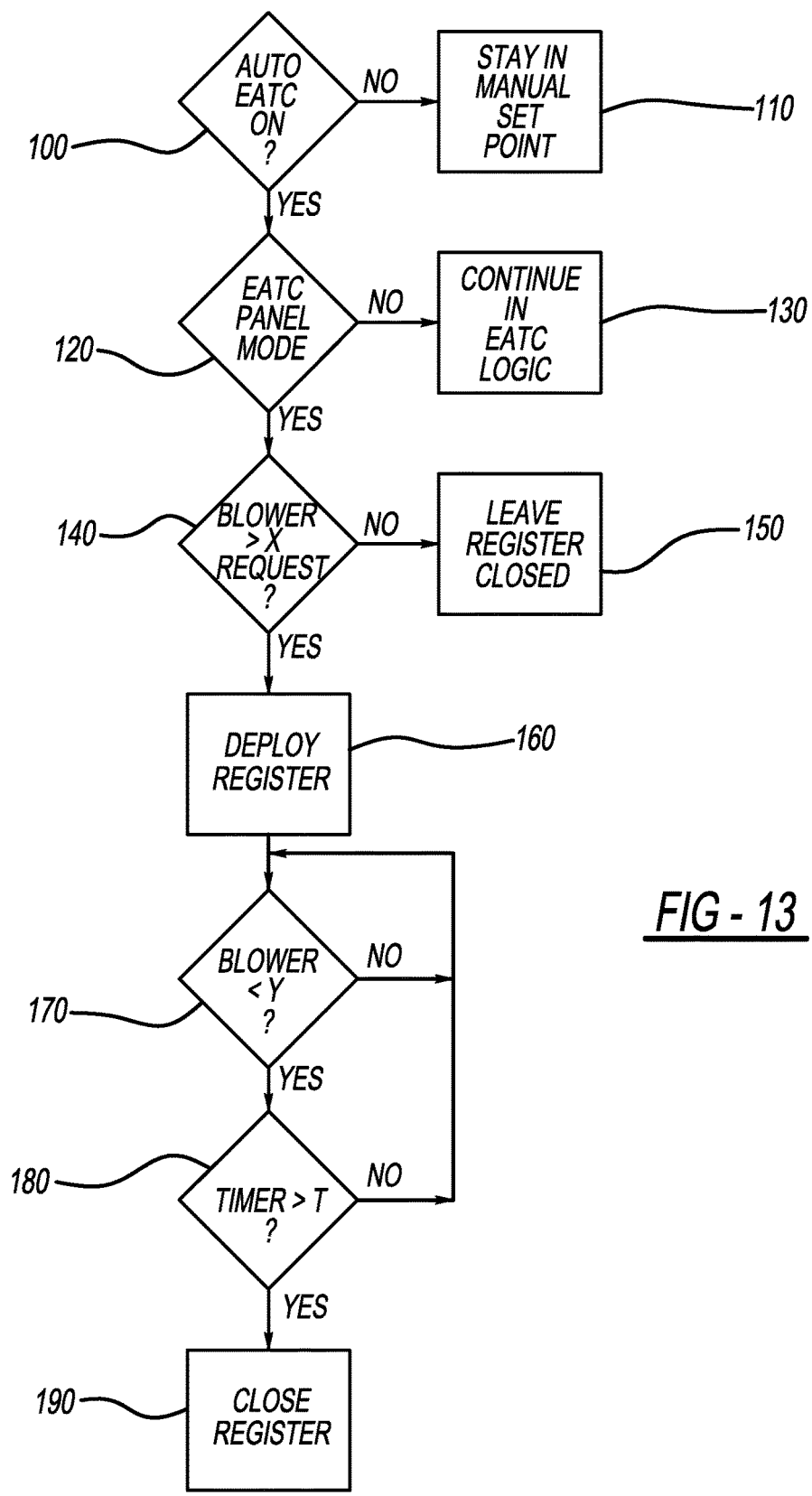
FIG. 13 is a flow chart illustrating the selectively deployable register control strategy of the disclosed invention.

Regardless of the embodiment of the registers or of the method of closing the upper registers, the control strategy for operating the selectively deployable register system of the disclosed invention is the same or is similar. A sample control strategy is set forth in FIG. 13.

At step 100 an inquiry as to whether or not the automatic EATC (Electronic Automatic Temperature Control) is on. If not on, the decision is made to remain at the manual set point at step 110. If it is on, then the question is asked whether or not the EATC is in panel mode at step 120. If not, at step 130 the decision is made to continue to follow the EATC logic and the register remains down.

If the EATC is in panel mode, then a request is made at step 140 asking whether or not the blower is operating above a specified set speed. If the logic determines that no cooling pull-down is needed and thus the blower does not operate at a high fan speed the deployable register remains in its recessed or closed position at step 150. However, in the event that the logic determines that a pull-down is needed and the blower should be above a set speed then the deployable register is moved to its deployed or open position at step 160.

It may be additionally desired to include a logic to prevent continuous or near-continuous movement of the register between its closed position and its open position. A non-limiting example of such a logic is shown in steps 170, 180 and 190. Once the register is in its deployed position at step 160, a determination is made at step 170 as to whether or not the blower is operating below a defined speed. If no, the question is asked again. If yes, the logic carries forward to step 180 in which a determination is made as to run time. If the run time is less than a defined time, then the logic returns to initiate step 170 again. If the run time is greater than a defined time, the register is closed at step 190. However, as long as the answers to one or both of the inquiries made at steps 170 and 180 remain no, the register remains in its deployed position until optimum cabin conditions have been achieved.

Variations of the described strategy may be made without deviating from the spirit and scope of the disclosed invention. In addition, the occupant of the vehicle may also manually deploy or recess one or more of the registers at any time.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle air circulating system comprising:
   an instrument panel;
   a register assembly movably attached to said instrument panel, said assembly comprising a first register and a second register, said second register located above said first register, said first and second registers being movable together in relation to said instrument panel, said assembly being movable between a closed position in which said first register is substantially obstructed within said instrument panel and an open position in which said first register is substantially extended from said instrument panel, said second register remaining unobstructed;
   a controller in communication with said assembly for positioning said assembly between said open and closed positions; and
   an interior condition sensor in communication with said controller.

2. The vehicle air circulating system of claim 1 in which said first register has an outlet opening having a dimension and said second register has an outlet opening having a dimension, said dimensions being different whereby one outlet opening is larger than the other.

3. The vehicle air circulating system of claim 1 in which said first register is a pair of registers.

4. The vehicle air circulating system of claim 1 wherein said register assembly is pivotably attached to said instrument panel.

5. The vehicle air circulating system of claim 4 wherein said register assembly is pivotably movable between said closed position and said open position.

6. The vehicle air circulating system of claim 1 wherein at least one of said registers includes a pivotably movable gate to control air flow.

7. An air circulating system for a vehicle having an HVAC system, comprising:
an instrument panel;
a movable register assembly movably attached to said instrument panel, said assembly comprising a first register having an outlet opening and a second register having an outlet opening, said outlet openings being of different sizes, said second register located above said first register, said first and second registers being movable together in relation to said instrument panel, said assembly being movable between a closed position in which said first register is substantially recessed within said instrument panel and an open position in which said first register is substantially extended from said instrument panel;
a controller in communication with said assembly for positioning said assembly between said open and closed positions; and
an interior condition sensor in communication with said controller and the HVAC system.

8. The vehicle air circulating system of claim 7 in which said first register is a pair of registers.

9. The vehicle air circulating system of claim 8 wherein said register assembly is pivotably attached to said instrument panel.

10. The vehicle air circulating system of claim 9 wherein said register assembly is pivotably movable between said closed position and said open position.

11. An air circulating system for a vehicle comprising:
an instrument panel having a front;
a movable register assembly movably attached to said instrument panel, said assembly comprising a first register having an opening and a second register having an opening, said first register being a front register, said opening of said first register being larger than said opening of said second register, said first and second registers being movable together in relation to said instrument panel, said assembly being movable between a closed position in which said first register is substantially recessed within said instrument panel and an open position in which said first register is substantially extended from said instrument panel;
a controller in communication with said assembly for positioning said assembly between said open and closed positions; and
an interior condition sensor in communication with said controller.

12. The vehicle air circulating system of claim 11 wherein said register assembly is pivotably attached to said instrument panel.

13. The vehicle air circulating system of claim 12 wherein said register assembly is pivotably movable between said closed position and said open position.

* * * * *